US008362194B2

(12) United States Patent
Watanabe et al.

(10) Patent No.: US 8,362,194 B2
(45) Date of Patent: Jan. 29, 2013

(54) POLYMERIZABLE COMPOSITION AND POLYTHIOCARBONATE POLYTHIOETHER

(75) Inventors: Masanori Watanabe, Ube (JP); Takafumi Hirakawa, Ube (JP); Atsushi Morikami, Ube (JP)

(73) Assignee: Ube Industries, Ltd., Ube-Shi (JP)

( * ) Notice: Subject to any disclaimer, the term of this patent is extended or adjusted under 35 U.S.C. 154(b) by 742 days.

(21) Appl. No.: 12/092,068

(22) PCT Filed: Oct. 27, 2006

(86) PCT No.: PCT/JP2006/321555
§ 371 (c)(1),
(2), (4) Date: Aug. 19, 2009

(87) PCT Pub. No.: WO2007/052568
PCT Pub. Date: May 10, 2007

(65) Prior Publication Data
US 2009/0306334 A1     Dec. 10, 2009

(30) Foreign Application Priority Data
Oct. 31, 2005   (JP) ................. 2005-317636

(51) Int. Cl.
C08G 75/04 (2006.01)
(52) U.S. Cl. .............. 528/374; 528/370; 528/380
(58) Field of Classification Search .......... 528/374, 528/375, 370, 380
See application file for complete search history.

(56) References Cited

U.S. PATENT DOCUMENTS

| 6,117,923 | A | 9/2000 | Amagai et al. |
| 7,385,022 | B2 * | 6/2008 | Watanabe et al. ............ 528/65 |

FOREIGN PATENT DOCUMENTS

| EP | 0 425 049 A | 5/1991 |
| JP | 60-199016 | 10/1985 |
| JP | 60199016 | 10/1985 |
| JP | 05-148340 | 6/1993 |
| JP | 09-071580 | 3/1997 |
| JP | 09-110979 | 4/1997 |
| JP | 09-255781 | 9/1997 |
| JP | 11-258402 | 9/1999 |
| JP | 11-322930 | 11/1999 |
| JP | 2000/053761 | 2/2000 |
| JP | 2002/201277 | 7/2002 |
| JP | 2003/176358 | 6/2003 |
| JP | 2005-029608 A | 2/2005 |
| JP | 2005/031175 | 2/2005 |
| JP | 2005/336476 | 12/2005 |

OTHER PUBLICATIONS

Montaudo et al. (J. of Poly. Sci., Part A: Poly. Chem., 27, 2277-2290).*
Extended European Search Report dated Nov. 19, 2009 issued in European Patent Application No. EP 06 82 2516, filed Oct. 27, 2006.
Marianucci et al., "Refractive index of poly(thiocarbonate)s and poly(dithiocarbonate)s," *Polymer*, (1994) 35(7):1564-1566.
Pilati et al., "Aliphatic poly(dithiocarbonate)s: synthesis and thermal properties," *Polymer Communications*, (1990) 31:431-433.
International Search Report mailed on Jan. 23, 2007 in PCT/JP2006/321555, filed Oct. 27, 2006.
Written Opinion dated Jan. 23, 2007 issued in PCT/JP2006/321555, filed Oct. 27, 2006.
International Preliminary Report on Patentability mailed on May 6, 2008 issued in PCT/JP2006/321555, filed Oct. 27, 2006.
International Search Report mailed on Jan. 23, 2007 in PCT/JP2006/321554, filed Oct. 27, 2006.
Written Opinion dated Jan. 23, 2007 issued in PCT/JP2006/321554, filed Oct. 27, 2006.
International Preliminary Report on Patentability mailed on May 6, 2008 issued in PCT/JP2006/321554, filed Oct. 27, 2006.
Extended European Search Report dated Nov. 19, 2009 issued in European Patent Application No. EP 06 82 2515, filed Oct. 27, 2006.

* cited by examiner

*Primary Examiner* — Shane Fang
(74) *Attorney, Agent, or Firm* — Knobbe Martens Olson & Bear LLP

(57) ABSTRACT

Disclosed is a polymerizable composition comprising Component (a): a polythiocarbonate polythiol, Component (b): an episulfide compound, and optionally Component (c): an organic compound having a functional group that is reactive to the episulfide compound. The polymerizable composition can be cured to provide a polythioether having excellent optical properties (a high refractive index and a high Abbe's number) as well as excellent mechanical properties (a high bending distortion and a high glass transition temperature) and thus exhibiting excellent properties as an optical material.

13 Claims, No Drawings

POLYMERIZABLE COMPOSITION AND POLYTHIOCARBONATE POLYTHIOETHER

CROSS REFERENCE TO RELATED APPLICATION

This application claims the benefit and priority to and is a U.S. National Phase of PCT International Application Number PCT/JP2006/321555, filed on Oct. 27, 2006, designating the United States of America, which claims priority under 35 U.S.C. §119 to Japanese Application Number 2005-317636 filed on Oct. 31, 2005. The disclosures of the above-described applications are hereby incorporated by reference in their entirety.

TECHNICAL FIELD

The present invention relates to a polythioether useful as resins for optical application and a composition for preparing it. A polythioether has excellent optical properties, that is, a high refractive index and a low dispersion, and is used in, for example, a plastic lens, a prism, an optical fiber, an information storage substrate, a color filter or an infrared absorbing filter.

BACKGROUND ART

Recently, as optical materials, plastics have been predominantly used because they are light-weight and resistant to fracture in comparison with glasses and readily stainable. Commonly used plastic materials for optical applications include polyethyleneglycol bisallyl carbonates, polymethyl methacrylates, alicyclic polyolefins and polycarbonate resins. However, these materials have a refractive index of 1.6 or less, so that when they are used for coating or bonding of a material having a high refractive index, the properties of the object adhered cannot be fully utilized and furthermore, when they are used for an optical lens, a lens thickness becomes larger. Since a plastic material having a higher refractive index generally tends to have a lower Abbe's number and a larger chromatic aberration, an observed object looks tinted and blurred. Thus, a material having a high refractive index and a high Abbe's number has been needed as an optical resin.

As such an optical resin, Patent document 1 has proposed a polythiourethane obtained by reacting a polythiol and a polyisocyanate and Patent document 2 has further proposed such a polythiourethane prepared from a polythiol with a higher sulfur content. Since these polythiourethanes generally have a higher refractive index of 1.6 or more and a higher Abbe's number of 30 or more, many of these have been used as a recent thin and light optical lens.

In seeking a material having a further higher refractive index, there has been proposed a polythioether as a ring-opening polymer of a polyepisulfide described in, for example, Patent document 3 or Patent document 4. Since a polythioether has a higher refractive index of 1.65 or higher to 1.7 or higher and a higher Abbe's number of 30 or more, it has contributed to thinning of an optical lens or a prism.

However, a polythioether tends to have a smaller bending distortion, leading to its fragility. There has been, therefore, needed such a material having a higher refractive index and a higher Abbe's number, which is endowed with flexibility to a bending stress. For giving flexibility to a bending stress, polythioethers have been prepared using a polythiol or polyamine as a resin modifier (for example, Patent documents 5, 6 and 7, etc. (Japanese Laid-open Patent Publication No. 1997-255781, 1999-322930 and 1999-258402), but these have lower heat resistance (glass transition temperature).

Patent document 1: Japanese Examined Patent Publication No. 1992-58489;
Patent document 2: Japanese Laid-open Patent Publication No. 1993-148340;
Patent document 3: Japanese Laid-open Patent Publication No. 1997-71580;
Patent document 4: Japanese Laid-open Patent Publication No. 1997-110979;
Patent document 5: Japanese Laid-open Patent Publication No. 1997-255781;
Patent document 6: Japanese Laid-open Patent Publication No. 1999-322930;
Patent document 7: Japanese Laid-open Patent Publication No. 1999-258402.

DISCLOSURE OF THE INVENTION

Subject to be Solved by the Invention

Thus, an objective of the present invention is to provide a polythioether having, in addition to excellent optical properties (a high refractive index and a high Abbe's number), excellent mechanical properties (a high bending distortion and a high glass transition temperature) and exhibiting excellent properties as an optical material, and a polymerizable composition for preparing the polythioether.

Means to Solve the Subject

The present invention relates to the followings.

[1] A polymerizable composition comprising
Component (a): a polythiocarbonate polythiol,
Component (b): an episulfide compound, and
optionally, Component (c): an organic compound having a functional group reactive to said episulfide compound.

[2] The polymerizable composition as described in [1], comprising Component (a) in amount of 1 to 40% by weight, Component (b) in amount of 50 to 99% by weight and Component (c) in amount of 0 to 20% by weight.

[3] The polymerizable composition as described in [1] or [2], wherein said polythiocarbonate polythiol comprises a thiocarbonate moiety represented by formula (1):

one or two or more polyvalent hydrocarbon groups to which the thiocarbonate moiety is bound, wherein these polyvalent hydrocarbon groups may optionally have a substituent uninvolved in a ring-opening reaction of said episulfide compound and may optionally contain a heteroatom or a ring structure in their carbon chain), and
a terminal SH group,
and wherein said polythiocarbonate polythiol has a number average molecular weight of 200 to 2500.

[4] The polymerizable composition as described in [3], wherein said polythiocarbonate polythiol has a repeating unit represented by formula (2):

wherein R represents a divalent hydrocarbon group, which optionally may have a substituent uninvolved in a ring-opening reaction of the episulfide compound and may contain a heteroatom or a ring structure in its carbon chain, and, in addition, Rs in one molecular chain may be the same or different; and wherein said polythiocarbonate polythiol has a number average molecular weight of 200 to 2500.

[5] The polymerizable composition as described in any of [1] to [4], wherein said polythiocarbonate polythiol is a liquid at 40° C.

[6] The polymerizable composition as described in any of [1] to [5], wherein said polythiocarbonate polythiol has an APHA of 60 or less.

[7] The polymerizable composition as described in any of [1] to [6], wherein 5 mol % or less of the terminal groups in said polythiocarbonate polythiol are terminal groups other than SH.

[8] The polymerizable composition as described in any of [1] to [7], wherein said polythiocarbonate polythiol is synthesized by a transesterification reaction, and the amount of a remaining transesterification catalyst is 40 ppm or less based on the weight of the polythiocarbonate polythiol.

[9] The polymerizable composition as described in any of [1] to [8], wherein said episulfide compound has at least two episulfide groups in one molecule.

[10] The polymerizable composition as described in any of [1] to [9], wherein the organic compound as Component (c) is at least one selected from the group consisting of thiol compounds, amine compounds, allyl compounds, (meth)acrylate compounds, organic acids and their anhydrides, mercaptoorganic acids, mercaptoamines and phenol compounds.

[11] The polymerizable composition as described in any of [1] to [10], further comprising a basic catalyst as a curing catalyst.

[12] The polymerizable composition as described in [11], wherein said basic catalyst is at least one selected from the group consisting of tertiary amines, tertiary phosphines, quaternary ammonium salts and quaternary phosphonium salts.

[13] A polythiocarbonate polythioether prepared by curing the polymerizable composition as described in any of [1] to [12].

EFFECT OF THE INVENTION

According to the present invention, there can be provided a polythioether having, in addition to excellent optical properties (a high refractive index and a high Abbe's number), excellent mechanical properties (a high bending distortion and a high glass transition temperature) and exhibiting excellent properties as an optical material as well as a polymerizable composition for preparing it.

BEST MODE FOR CARRYING OUT THE INVENTION

A polymerizable composition of the present invention contains, as described above, Component (a): a polythiocarbonate polythiol, Component (b): an episulfide compound, and Component (c): an organic compound having a functional group which is reactive to the episulfide compound as an optional component, that is, a component which may or may not be present, and can be cured to provide a polythiocarbonate polythioether of the present invention.

A polythiocarbonate polythiol as Component (a) has a thiocarbonate structure —X—(C=O)—S— where X is O or S, particularly preferably S. Specifically, Component (a): a polythiocarbonate polythiol preferably has, as a thiocarbonate moiety, a structure represented by formula (1):

In the polythiocarbonate polythiol as Component (a), the thiocarbonate moiety of formula (1) is bound to a polyvalent hydrocarbon group which is divalent or more and preferably octavalent or less, further preferably pentavalent or less. Furthermore, one molecule may contain polyvalent hydrocarbon groups with different valences or alternatively with the same valence but with different carbon numbers or structures. The polyvalent hydrocarbon group may have a substituent uninvolved in a ring-opening reaction of the episulfide compound, and may contain a heteroatom or a ring structure in its carbon chain.

When the polyvalent hydrocarbon group is for example a divalent group R, a polythiocarbonate polythiol has a repeating unit as shown below.

When, for example, a divalent hydrocarbon group $R^1$ and a trivalent hydrocarbon group $R^2$ are contained in one molecule, a polythiocarbonate polythiol has a structure which is branched at the hydrocarbon group $R^2$ as shown below.

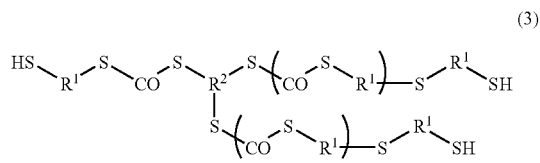

As the content of trivalent or more polyvalent hydrocarbons increases, a branched and a crosslinked structures increase. In one preferable aspect of the present invention, the polyvalent hydrocarbon group is divalent and may contain, if necessary, a trivalent or more group. When a trivalent or more hydrocarbon group is contained, its proportion is preferably 30 mol % or less, more preferably 20% or less to the total polyvalent hydrocarbons.

The polythiocarbonate polythiol as Component (a) contains a terminal SH group and all the terminal groups are preferably SH, but as described later, terminal groups other than SH may be contained in a small proportion.

A typical structure where R is a divalent hydrocarbon group is represented by formula (4):

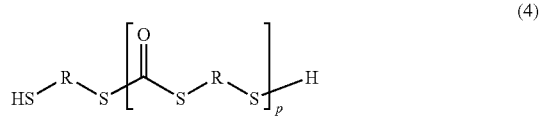

Generally, the compound is obtained as a mixture of compounds having different repeating unit numbers, and in the formula, p is a number selected such that the compound of formula (4) has a number average molecular weight of 200 to 2500.

The polythiocarbonate polythiol is preferably prepared by a transesterification reaction of a carbonate compound and a polythiol compound as starting materials in the presence of a transesterification catalyst. Here, hydrocarbon groups and terminal SH groups in the polythiocarbonate polythiol are derived from the starting polythiol compound used. Thus, there will be described the polythiocarbonate polythiol, illustrating its preparation process.

Examples of the starting carbonate compound include dialkyl carbonates such as dimethyl carbonate, diethyl carbonate, di-n-butyl carbonate and diisobutyl carbonate; diaryl carbonates such as diphenyl carbonate; alkylene carbonates such as ethylene carbonate and propylene carbonate; and alkylaryl carbonates such as methylphenyl carbonate. Among these carbonate compounds, diaryl carbonates are preferable; diphenyl carbonate is particularly preferable.

The starting polythiol compound (that is, a compound having two or more thiol groups) may be a polythiol compound corresponding to the polyol compound used in the preparation of the polycarbonate polyol. Specifically, it may be a compound where a mercapto group is attached to a polyvalent (at least, divalent) hydrocarbon group. This hydrocarbon group may be either an aliphatic (including an alicyclic) hydrocarbon group (preferably having 2 to 14 carbon atoms) or an aromatic (including an arylaliphatic) hydrocarbon group (preferably having 6 to 14 carbon atoms) and may have a substituent (for example, an alkyl group and an alkoxy group) uninvolved in a ring-opening reaction of the episulfide compound, and may contain, in its carbon chain, an atom or atomic group uninvolved in the reaction such as a heteroatom (for example, oxygen, sulfur or nitrogen) and a ring structure (for example, an alicyclic structure, an aromatic ring structure or a heterocycle).

Among polyvalent hydrocarbon groups, preferred are divalent groups, among which divalent aliphatic hydrocarbon groups are particularly preferable. For the heteroatom described above, sulfur or oxygen is preferable and for the ring structure, an alicyclic structure or a saturated heterocyclic structure is preferable.

Examples of the polythiol compound in which the hydrocarbon group is an aliphatic hydrocarbon group include alkanedithiols such as 1,2-ethanedithiol, 1,3-propanedithiol, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,12-dodecanedithiol, 2,2-dimethyl-1,3-propanedithiol, 3-methyl-1,5-pentanedithiol and 2-methyl-1,8-octanedithiol; cycloalkanedithiols such as 1,4-cyclohexanedithiol and 1,4-bis(mercaptomethyl)cyclohexane;

heteroatom-containing alkanedithiols such as bis(2-mercaptoethyl) ether, bis(2-mercaptoethyl)sulfide, bis(2-mercaptoethyl)disulfide and 2,2'-(ethylene dithio)diethanethiol; heteroatom-containing cycloalkanedithiols such as 2,5-bis(mercaptomethyl)-1,4-dioxane and 2,5-bis(mercaptomethyl)-1,4-dithiane;

alkanetrithiols such as 1,1,1-tris(mercaptomethyl)ethane, 2-ethyl-2-mercaptomethyl-1,3-propanedithiol and 1,8-mercapto-4-mercaptomethyl-3,6-thiaoctane; and alkanetetrathiols such as tetrakis(mercaptomethyl)methane, 3,3'-thiobis(propane-1,2-dithiol) and 2,2'-thiobis(propane-1,3-dithiol).

Examples of the polythiol compound in which the hydrocarbon group is an aromatic hydrocarbon group include arenedithiols (aromatic dithiols) such as 1,2-benzenedithiol, 1,3-benzenedithiol, 1,4-benzenedithiol, 1,2-bis(mercaptomethyl)benzene, 1,3-bis(mercaptomethyl)benzene, 1,4-bis(mercaptomethyl)benzene and toluene-3,4-dithiol; and arenetrithiols (aromatic trithiols) such as 1,3,5-benzenetrithiol and 1,3,5-tris(mercaptomethyl)benzene.

In the present invention, the polythiol compound may be used alone or in combination of two or more (at least two). When the polyvalent hydrocarbon group in the polythiol compound is a divalent hydrocarbon group, it gives a polythiocarbonate polythiol having a single type of repeating unit represented by formula (2) when being used alone; and it gives a polythiocarbonate polythiol having a plurality types of (at least two types) repeating units represented by formula (2) in which Rs are different (copolymer) when being used in combination of two or more types. The use of a plurality of polythiol compounds, for example, the combination of the polythiol compounds described below, gives a polythiocarbonate polythiol having a low melting point and a low crystallization temperature which is a liquid at 40° C., preferably at 30° C. Among the above-mentioned polythiol compounds, the following combinations may be listed as an example. In a particular embodiment, a polythiocarbonate polythiol which is a liquid at 20° C., furthermore a polythiocarbonate polythiol which is a liquid at 10° C. or 0° C. is realized. There are no particular restrictions to a ratio of a plurality of polythiol compounds as long as it gives a liquid polythiocarbonate polythiol. Such a liquid polythiocarbonate polythiol is extremely useful in practical use because it allows for cast polymerization at an ambient temperature.

A combination of aliphatic straight-chain dithiols having different carbon chain lengths: for example, a combination of 1,5-pentanedithiol and 1,6-hexanedithiol and a combination of bis(mercaptoalkyl)sulfide (for example, bis(2-mercaptoethyl)sulfide) and 1,6-hexanedithiol;

A combination of an aliphatic straight-chain dithiol and an aliphatic branched polythiol: for example, a combination of 1,6-hexanedithiol and 3-methyl-1,5-pentanedithiol;

A combination of an aliphatic straight-chain dithiol or aliphatic branched polythiol and an alkanedithiol having an aliphatic hydrocarbon ring: for example, a combination of 1,6-hexanedithiol and 1,4-bis(mercaptomethyl)cyclohexane;

A combination of an aliphatic straight-chain dithiol or aliphatic branched polythiol and an alkanedithiol having a heteroatom and an aliphatic hydrocarbon ring: for example, a combination of 1,6-hexanedithiol and 2,5-bis(mercaptomethyl)-1,4-dithiane.

When a plurality types of polythiol compounds are used, polythiol compounds having different valences may be used; for example, tri- or higher valent polythiol compounds (that is, the polyvalent hydrocarbon group in the polythiol compound has a valence of three or more) such as a trithiol, a tetrathiol and a pentathiol may be combined with a dithiol. In such a case, a branched structure as represented by formula (3) is present. Since the use of a tri- or higher valent polythiol increases a branched and/or a crosslinked structures in a polymer, it may be preferably selected as appropriate in the light of the properties of a polythiocarbonate polythiol obtained. The amount of the trivalent or more polythiol is preferably 30 mol % or less, particularly preferably 20 mol % or less to the amount of all the polythiol compounds.

In preparation of a polythiocarbonate polythiol, preferably a carbonate compound (particularly, a diaryl carbonate) and a polythiol compound are subject to a transesterification reaction in the presence of a transesterification catalyst while continuously removing a byproduct alcohol (particularly, an aryl alcohol) from the system. Here, the amount of the polythiol compound is preferably 0.8 to 3.0 fold moles, further preferably 0.85 to 2.5 fold moles, particularly preferably 0.9 to 2.5 fold moles to the carbonate compound such that all or substantially all the terminal groups in a polythiocarbonate polythiol molecular chain obtained become a mercapto group. Furthermore, the amount of the transesterification catalyst is preferably 1 to 5000 molar ppm, further preferably 10 to 1000 molar ppm to the amount of the polythiol compound.

In the above transesterification reaction, the diaryl carbonate is preferably diphenyl carbonate, and when using a polythiol compound in which a polyvalent hydrocarbon group is a divalent hydrocarbon group, the carbon number of the divalent hydrocarbon group R is preferably 4 to 14. Here, the amount of the polythiol compound containing a divalent hydrocarbon group having 4 to 14 carbons is preferably 1.05 to 3.0 fold moles, particularly preferably 1.1 to 2.5 fold moles to the amount of the diphenyl carbonate. Thus, a proportion of terminal groups other than SH in terminal groups can be made 5% or less, further 2% or less, particularly 1% or less. When using a diaryl carbonate (for example, diphenyl carbonate), the terminal groups other than SH are aryloxy (for example, phenoxy). The conditions can be appropriately chosen as described above, to give a polythiocarbonate polythiol which is less colored (that is, an APHA is 60 or less, further 40 or less, particularly 20 or less) and in which all or substantially all the terminals in the molecular chain are a mercapto group. The control of the proportion of the aryloxy group in the terminal groups enables to provide a polythiocarbonate polythioether having, in addition to excellent optical properties, excellent mechanical properties. An "APHA" refers to a hue in a melt state by heating and a proportion of the aryloxy group is molar basis (the same shall apply hereinafter).

There are no particular restrictions to the conditions (temperature, pressure and time) of the above transesterification reaction as long as a target product can be produced, but preferably a carbonate compound and a polythiol compound are reacted in the presence of a transesterification catalyst, under an ambient or reduced pressure at 110 to 200° C. for about 1 to 24 hours, then under a reduced pressure at 110 to 240° C. (particularly 140 to 240° C.) for about 0.1 to 20 hours, and furthermore, at the same temperature under a reduced pressure where vacuum is gradually increased to a final pressure of 20 mmHg (2.7 kPa) or less for about 0.1 to 20 hours, for efficiently producing the target product. When using a plurality of polythiol compounds, a carbonate compound and the polythiol compounds may be subjected to a transesterification reaction under the conditions as described above to produce a corresponding polythiocarbonate polythiol, with which another polythiol compound may be reacted. Here, when the carbonate compound is diphenyl carbonate, diphenyl carbonate and a polythiol compound in which R has 4 to 14 carbon atoms are preferably subjected to a transesterification reaction to produce a polythiocarbonate polythiol, which is then reacted with a polythiol compound in which R has 2 to 4 carbon atoms, to provide a target product. For removing a byproduct alcohol, a reactor is preferably equipped with a distilling apparatus and furthermore, the reaction may be conducted under a stream of an inert gas (for example, nitrogen, helium and argon).

There are no particular restrictions to a transesterification catalyst as long as it is a compound catalyzing the transesterification reaction. Examples include basic compounds such as potassium carbonate, sodium alkoxides (for example, sodium methoxide and sodium ethoxide) and quaternary ammonium salts (tetraalkylammonium hydroxides such as tetrabutylammonium hydroxide); titanium compounds such as titanium tetrachloride and tetraalkoxytitaniums (for example, tetra-n-butoxytitanium and tetraisopropoxytitanium); and tin compounds such as metal tin, tin hydroxide, tin chlorides, dibutyltin laurate, dibutyltin oxide and butyltin tris(2-ethylhexanoate).

Among the transesterification catalysts, preferred are basic compounds such as potassium carbonate, sodium alkoxides (for example, sodium methoxide and sodium ethoxide) and quaternary ammonium salts (for example, tetraalkylammonium hydroxides such as tetrabutylammonium hydroxide); and tetraalkoxytitaniums (for example, tetra-n-butoxytitanium and tetraisopropoxytitanium). A transesterification catalyst may be any of compounds which can control a de-COS reaction, a tinting degree, and the amount of a remaining catalyst such that the optical and the mechanical properties of a polythiocarbonate polythioether can be maintained in a high level. Among others, a basic compound is particularly preferable because it can accelerate the reaction, give a lower tinting degree, that is, an APHA of 60 or less, and give a high quality polythiocarbonate polythiol in which a molar proportion (the same shall apply hereinafter) of a thioether structure (—R—S—R— if a dithiol having a divalent hydrocarbon group R is used) formed by a de-COS reaction in the thiocarbonate structure (—S—(C=O)—S—) is 3% or less to the total of the remaining thiocarbonate structure and the thioether structure. Among basic compounds, a quaternary ammonium salt (particularly, a tetraalkylammonium hydroxide such as tetrabutylammonium hydroxide) is more preferable because it gives a polythiocarbonate polythiol having an APHA of 60 or less and a proportion of the thioether structure of 1% or less and free from a metal component. By controlling a de-COS reaction as described above, an S content and a thiocarbonate structure in a polythiocarbonate polythiol can be maintained in a high level. "Remaining thiocarbonate structure" referred here means a thiocarbonate structure that has not undergone de-COS reaction.

In the present invention, a polythiocarbonate polythiol preferably has a number average molecular weight (Mn) of 200 to 2500, further 400 to 2000. If the molecular weight is out of the range, a polythiocarbonate polythioether from a polythiocarbonate polythiol tends to have inadequate optical or mechanical properties. Namely, when the number average molecular weight is less than 200, a polythiocarbonate polythioether has a smaller distortion to bending failure, while when it is more than 2500, its melting point and crystallization temperature are increased, leading to deteriorated compatibility with an episulfide compound and a reduced optical transmittance of the polythiocarbonate polythioether. Thus, the amounts of the carbonate compound and the polythiol compound are adjusted such that a desired molecular weight can be obtained, and when a number average molecular weight of a reaction product is out of the desired range. That is, when a molecular weight is too small, it is transesterified while distilling the polythiol compound further, whereas when a molecular weight is too large, the polythiol compound is added for further proceeding of the transesterification reaction, to adjust the molecular weight.

After adjusting a molecular weight, if necessary, it is preferable to inactivate the remaining transesterification catalyst in the polythiocarbonate polythiol. The transesterification catalyst can be inactivated by a known method in which a phosphorous compound (for example, phosphoric acid, butyl phosphate and dibutyl phosphate) is added when a tetraalkoxytitanium is used; and an inorganic or organic acid (for example, sulfuric acid and para-toluene sulfonic acid) is added in an equimolar amount to a catalyst under heating at 40° C. to 150° C. when a basic compound is used. When addition of an acid causes salt precipitation, the product is preferably washed with water.

A polythiocarbonate polythiol thus obtained may be washed with water to further reduce its tinting degree (APHA). For example, when using tetraalkylammonium hydroxide as a transesterification catalyst, a polythiocarbonate polythiol obtained already has an APHA of 60 or less, but washing with water can reduce it to 40 or less, further to 20 or less (10 or less). When the catalyst is a titanium compound, an APHA (over 100) of a polythiocarbonate polythiol can be also reduced in a similar manner. Washing with water can be conducted by dissolving a polythiocarbonate polythiol in an appropriate solvent such as methylene chloride and then, after adding a proper amount of water, mixing or stirring the mixture uniformly. This procedure may be, if necessary, repeated multiple times. Furthermore, by using a basic compound or titanium compound as a transesterification catalyst, the amount of the remaining catalyst in the polythiocarbonate polythiol can be reduced to 10 ppm or less (further, 2 ppm or less) by weight (the same shall apply hereinafter) by washing with water. The amount of the remaining catalyst can be controlled as described above, to maintain the optical and the mechanical properties of a polythiocarbonate polythioether in a high level.

Next, Component (b): an episulfide compound is preferably a compound having two episulfide groups in one molecule.

Examples of an episulfide compound used in the present invention include straight-chain aliphatic episulfide compounds such as bis(β-epithiopropyl)ether, bis(β-epithiopropyl)sulfide, bis(β-epithiopropyl)disulfide, bis(β-epithiopropyloxy)methane, bis(β-epithiopropylthio)methane, 1,2-bis(β-epithiopropyloxy)ethane, 1,2-bis(β-epithiopropylthio)ethane, 1,2-bis(β-epithiopropyloxy)propane, 1,2-bis(β-epithiopropylthio)propane, 1,3-bis(β-epithiopropyloxy)propane, 1,3-bis(β-epithiopropylthio)propane, 1,2-bis(β-epithiopropyloxymethyl)propane, 1-(β-epithiopropyloxy)-2-(β-epithiopropyloxymethyl)propane, 1,3-bis(β-epithiopropylthio)-2-methylpropane, 1,4-bis(β-epithiopropyloxy)butane, 1,4-bis(β-epithiopropylthio)butane, 1,4-bis(β-epithiopropylthio)-2-methylbutane, 1,3-bis(β-epithiopropyloxy)butane, 1,3-bis(β-epithiopropylthio)butane, 1-(β-epithiopropyloxy)-3-(β-epithiopropyloxymethyl)butane, 1,5-bis(β-epithiopropyloxy)pentane, 1,5-bis(β-epithiopropylthio)pentane, 1,5-bis(β-epithiopropylthio)-2-methylpentane, 1,5-bis(β-epithiopropylthio)-3-thiapentane, 1,5-(β-epithiopropyloxy)-4-(β-epithiopropyloxymethyl)pentane, 1,6-bis(β-epithiopropyloxy)hexane, 1,6-bis(β-epithiopropylthio)hexane, 1-(β-epithiopropyloxy)-2-(β-epithiopropyloxymethyl)hexane, 1,6-bis(β-epithiopropylthio)-2-methylhexane, 3,8-bis(β-epithiopropylthio)-3,6-dithiaoctane, tetrakis(β-epithiopropyloxymethyl)methane, 1,1,1-tris(β-epithiopropyloxymethyl)propane, 1,2,3-tris(β-epithiopropylthio)propane, 2,2-bis(β-epithiopropylthio)-1,3-bis(β-epithiopropylthiomethyl)propane, 2,2-bis(β-epithiopropylthiomethyl)-1-(β-epithiopropylthio)butane, 1,5-bis(β-epithiopropyloxy)-2-(β-epithiopropyloxymethyl)-3-thiapentane, 1,5-bis(β-epithiopropylthio)-2-(β-epithiopropylthiomethyl)-3-thiapentane, 1,5-bis(β-epithiopropyloxy)-2,4-bis(β-epithiopropyloxymethyl)-3-thiapentane, 1,5-bis(β-epithiopropylthio)-2,4-bis(β-epithiopropylthiomethyl)-3-thiapentane, 1-(β-epithiopropyloxy)-2,2-bis(β-epithiopropyloxymethyl)-4-thiahexane, 1-(β-epithiopropylthio)-2,2-bis(β-epithiopropylthiomethyl)-4-thiahexane, 1,5,6-tris(β-epithiopropyloxy)-4-bis(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropylthio)-4-(β-epithiopropylthiomethyl)-3,6-dithiaoctane, 1,8-bis(β-epithiopropyloxy)-4,5-bis(β-epithiopropyloxymethyl)-3,6-dithiaoctane, 1,8-bis(β-epithiopropylthio)-4,5-bis(β-epithiopropylthiomethyl)-3,6-dithiaoctane, 1,8-bis(β-epithiopropyloxy)-4,4-bis(β-epithiopropyloxymethyl)-3,6-dithiaoctane, 1,8-bis(β-epithiopropylthio)-4,4-bis(β-epithiopropylthiomethyl)-3,6-dithiaoctane, 1,8-bis(β-epithiopropyloxy)-2,5-bis(β-epithiopropyloxymethyl)-3,6-dithiaoctane, 1,8-bis(β-epithiopropylthio)-2,5-bis(β-epithiopropylthiomethyl)-3,6-dithiaoctane, 1,8-bis(β-epithiopropyloxy)-2,4,5-tris(β-epithiopropyloxymethyl)-3,6-dithiaoctane, 1,8-bis(β-epithiopropylthio)-2,4,5-tris(β-epithiopropylthiomethyl)-3,6-dithiaoctane, 1,9-bis(β-epithiopropyloxy)-5-(β-epithiopropyloxymethyl)-5-[2-(β-epithiopropyloxyethyl)oxymethyl]-3,7-dithianonane, 1,10-bis(β-epithiopropyloxy)-5,6-bis[(2-β-epithiopropyloxyethyl)oxy]-3,6,9-trithiadecane, 1,1,1-tris[{2-(β-epithiopropylthio)ethyl}thiomethyl]-2-(β-epithiopropylthio)ethane, 1,1,2,2-tetrakis[{2-(β-epithiopropylthio)ethyl}thiomethyl]ethane, 1,11-bis(β-epithiopropyloxy)-4,8-bis(β-epithiopropyloxymethyl)-3,6,9-trithiaundecane, 1,11-bis(β-epithiopropylthio)-4,8-bis(β-epithiopropylthiomethyl)-3,6,9-trithiaundecane, 1,11-bis(β-epithiopropyloxy)-4,7-bis(β-epithiopropyloxymethyl)-3,6,9-trithiaundecane, 1,11-bis(β-epithiopropylthio)-4,7-bis(β-epithiopropylthiomethyl)-3,6,9-trithiaundecane, 1,11-bis(β-epithiopropyloxy)-5,7-bis(β-epithiopropyloxymethyl)-3,6,9-trithiaundecane and 1,11-bis(β-epithiopropylthio)-5,7-bis(β-epithiopropylthiomethyl)-3,6,9-trithiaundecane;

cyclic aliphatic episulfide compounds such as 1,3-bis(β-epithiopropyloxy)cyclohexane, 1,3-bis(β-epithiopropylthio)cyclohexane, 1,4-bis(β-epithiopropyloxy)cyclohexane, 1,4-bis(β-epithiopropylthio)cyclohexane, 1,3-bis(β-epithiopropyloxymethyl)cyclohexane, 1,3-bis(β-epithiopropylthiomethyl)cyclohexane, 1,4-bis(β-epithiopropyloxymethyl)cyclohexane, 1,4-bis(β-epithiopropylthiomethyl)cyclohexane, bis[4-(β-epithiopropyloxy)cyclohexyl]methane, 2,2-bis[4-(β-epithiopropyloxy)cyclohexyl]propane, bis[4-(β-epithiopropyloxy)cyclohexyl]sulfide, 2,5-bis(β-epithiopropyloxymethyl)-1,4-dithiane, 2,5-bis(β-epithiopropylthiomethyl)-1,4-dithiane, 2,5-bis(β-epithiopropyloxyethyloxymethyl)-1,4-dithiane and 2,5-bis[{2-(β-epithiopropylthio)ethyl}thiomethyl]-1,4-dithiane;

aromatic episulfide compounds such as 1,3-bis(β-epithiopropyloxy)benzene, 1,3-bis(β-epithiopropylthio)benzene, 1,4-bis(β-epithiopropyloxy)benzene, 1,4-bis(β-epithiopropylthio)benzene, 1,3-bis(β-epithiopropyloxymethyl)benzene, 1,3-bis(β-epithiopropylthiomethyl)benzene, 1,4-bis(β-epithiopropyloxymethyl)benzene, 1,4-bis(β-epithiopropylthiomethyl)benzene, bis{4-(β-epithiopropylthio)phenyl}methane, 2,2-bis{4-(β-epithiopropylthio)phenyl}propane, bis{4-(β-epithiopropylthio)phenyl}sulfone and 4,4'-bis(β-epithiopropylthio)biphenyl; and mercapto-containing episulfide compounds such as 3-mercaptopropylene sulfide and 4-mercaptobutene sulfide. The episulfide compound is not limited to the compounds listed as examples, and they may be used alone or in combination of two or more. Among the episulfide compounds, preferred are various open-chain or cyclic aliphatic episulfide compounds as described above.

Next, Component (c): an organic compound having a functional group which is reactive to the episulfide compound is an optional component, that is, a component which may or may not be present in a composition. One or multiple types of such compounds may be present as a resin modifier for adjusting the optical properties and the mechanical properties of a polythiocarbonate polythioether prepared by curing the composition.

An organic compound as Component (c) (hereinafter, also referred to as a "resin modifier") has at least one functional group which is reactive to an episulfide group in an episulfide compound, and is particularly preferably a low-molecular-weight compound. For example, specific examples include thiol compounds, amine compounds, allyl compounds, (meth)acrylate compounds, organic acids and their anhydrides, mercaptoorganic acids, mercaptoamines and phenol compounds. A resin modifier such as a thiol compound has been used as a component preventing yellowing by heating as described in Japanese published unexamined application 1999-258402, but lowers a glass transition temperature (Tg) and deteriorates heat resistance. In the context of the present invention, addition of a polythiocarbonate polythiol as Component (a) also means that a resin modifier as Component (c) is partially or totally replaced with Component (a).

A thiol compound used for Component (c) may be a compound having one or two or more SH groups. The number of SH groups is generally 8 or less, preferably 6 or less. Examples of such a compound include aliphatic thiol compounds such as methyl mercaptan, ethyl mercaptan, 1,2-ethanedithiol, 1,2-propane dithiol, 1,3-propane dithiol, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,12-dodecanedithiol, 2,2-dimethyl-1,3-propane dithiol, 3-methyl-1,5-pentanedithiol, 2-methyl-1,8-octanedithiol, 1,4-cyclohexanedithiol, 1,4-bis(mercaptomethyl)cyclohexane, bis(2-mercaptoethyl)ether, bis(2-mercaptoethyl)sulfide, bis(2-mercaptoethyl)disulfide, 2,5-bis(mercaptomethyl)-1,4-dioxane, 2,5-bis(mercaptomethyl)-1,4-dithiane, 1,1,1-tris(mercaptomethyl)ethane, 2-ethyl-2-mercaptomethyl-1,3-propane dithiol, tetrakis(mercaptomethyl)methane, 3,3'-thiobis(propane-1,2-dithiol), 2,2'-thiobis(propane-1,3-dithiol), pentaerythritol tetrakis(mercaptopropionate) and pentaerythritol tetrakis(mercaptoacetate); and aromatic thiol compounds such as benzyl mercaptan, thiophenol, 1,2-benzenedithiol, 1,3-benzenedithiol, 1,4-benzenedithiol, 1,3,5-benzenetrithiol, 1,2-bis(mercaptomethyl)benzene, 1,3-bis(mercaptomethyl)benzene, 1,4-bis(mercaptomethyl)benzene and 1,3,5-tris(mercaptomethyl)benzene, toluene-3,4-dithiol.

An amine compound used for Component (c) may be a compound having at least one amino group; for example, primary aliphatic amine compounds such as ethylamine, n-propylamine, isopropylamine, n-butylamine, sec-butylamine, tert-butylamine, pentylamine, hexylamine, heptylamine, octylamine, decylamine, laurylamine, 3-pentylamine, 2-ethylhexylamine, 1,2-dimethylhexylamine, aminomethylbicycloheptane, cyclopentylamine, cyclohexylamine, 2,3-dimethylcyclohexylamine, aminomethylcyclohexane, ethylenediamine, 1,2-propylenediamine, 1,6-hexamethylenediamine, isophoronediamine, bis(4-aminocyclohexyl)methane and 2,7-diaminofluorene; primary aromatic amine compounds such as aniline, benzylamine, phenetylamine, meta(or para)-xylylenediamine, 1,5-, 1,8- or 2,3-diaminonaphthalene, and 2,3-, 2,6- or 3,4-diaminopyridine; secondary aliphatic amine compounds such as diethylamine, dipropylamine, di-n-butylamine, di-sec-butylamine, dicyclohexylamine, di(2-ethylhexyl)amine, piperidine, pyrrolidine, piperazine, 2-methylpiperazine, 2,5-dimethylpiperazine, 2,6-dimethylpiperazine, 1,1-di(4-piperidyl)methane, 1,2-(4-piperidyl)ethane, 1,3-(4-piperidyl)propane and 1,4-di(4-piperidyl)butane; and secondary aromatic amine compounds such as diphenylamine, dibenzylamine, N-methylbenzylamine and N-ethylbenzylamine.

Examples of an allyl compound used for Component (G) include diallyl phthalate, diallyl terephthalate, diallyl carbonate, allylamine, diallylamine and N-methylallyl amine.

Examples of (meth)acrylate compound used for Component (c) include benzyl(meth)acrylate, ethyleneglycol di(meth)acrylate, diethyleneglycol di(meth)acrylate, bisphenol-A di(meth)acrylate, neopentylglycol di(meth)acrylate and trimethylolpropane tri(meth)acrylate.

Examples of an organic acid and its anhydride used for Component (c) include thiodiglycolic acid, dithiodipropionic acid, phthalic anhydride, hexahydrophthalic anhydride, methylnorbornene acid anhydride, methylnorbornane acid anhydride, maleic anhydride, trimellitic anhydride and pyromellitic anhydride.

Examples of a mercaptoorganic acid used for Component (c) include thioglycolic acid, 3-mercaptopropionic acid, thioacetic acid, thiolactic acid, thiomalic acid and thiosalycylic acid.

Examples of a mercaptoamine used for Component (c) include aminoethyl mercaptan, 2-aminothiophenol, 3-aminothiophenol and 4-aminothiophenol.

Examples of a phenol compound used for Component (c) include phenol, o-cresol, m-cresol, p-cresol, 3-methoxyphenol, catechol, resorcinol, hydroquinone and pyrogallol.

Among these organic compounds used as Component (c), preferred are thiol compounds, amine compounds, mercaptoamines and phenol compounds, particularly thiol compounds in the light of a refractive index. Among these compounds, aliphatic compounds are further preferable.

Component (c) may be contained in a range of 0 to 20% by weight to the total amount of Components (a) to (c), and in an excessive amount, it may cause lowering of a Tg, so it is preferably 7% by weight or less.

In terms of the contents of Components (a), (b) and (c) in a composition of the present invention, as described above, preferably Components (a), (b) and (c) are contained in 1 to 40% by weight, 50 to 99% by weight and 0 to 20% by weight, respectively; more preferably, Components (a), (b) and (c) are contained in 5 to 35% by weight, 65 to 95% by weight and 0 to 7% by weight, respectively.

Particularly, a ratio of SH/episulfide groups (molar ratio) is 0.3 or less, preferably 0.2 or less, further preferably 0.15 or less, most preferably 0.1 or less and generally 0.001 or more, preferably 0.003 or more, further preferably 0.005 or more. When Component (c) is a thiol compound, it is preferable that the total of the mole number of SH in a polythiocarbonate polythiol of Component (a) and the mole number of SH in a thiol compound of Component (c) is within this range. For definitely realizing the effects of the use of Component (a), a proportion of SHs based on Component (a) to the total SHs based on Components (a) and (c) is preferably at least 10 mol % or more, more preferably 30 mol % or more, further preferably 50 mol % or more. When Component (c) is absent, the above proportion is 100 mol %.

A polymerizable composition of the present invention substantially consists of Components (a) to (c), and may furthermore contain an internal mold release, a light stabilizer, an ultraviolet absorber, an antioxidant, a painting and a filler depending on its utility within permissible limits.

A polythiocarbonate polythioether of the present invention is a cured product prepared by curing the polymerizable composition described above.

The curing reaction of the polymerizable composition can be conducted by mixing the composition in the presence or absence of a curing catalyst (that is, a polymerization catalyst) at −100 to 120° C., preferably −10 to 80° C., more preferably 0 to 50° C. for 0.1 to 72 hours for pre-polymerization, injecting the mixture into a glass or metal mold and heating it with gradual temperature rise from 10 to 200° C., preferably from 10 to 160° C., more preferably from 10 to 130° C. over 6 to 72 hours. A catalyst may be appropriately, if necessary, used as long as the curing reaction can be controlled, and its amount may be, for example, 5% by weight or less (furthermore, 1% by weight or less) to the amount of the polymerizable composition.

Components (a) to (c) and a catalyst may be mixed simultaneously or stepwise. For example, a polythiocarbonate polythiol as Component (a), an episulfide compound as Component (b) and an organic compound (resin modifier) as Component (c) may be mixed for pre-polymerization before a catalyst is added to initiate polymerization. Alternatively, first a polythiocarbonate polythiol and an episulfide compound may be pre-polymerized before an organic compound (resin modifier) as Component (c) such as another thiol compound is added and mixed. Such a composition containing a curing catalyst is also one aspect of a polymerizable composition of the present invention.

Examples of the catalyst used in the polymerization reaction include amines, phosphines, quaternary ammonium salts, quaternary phosphonium salts, tertiary sulfonium salts, secondary iodonium salts, mineral acids, Lewis acids, organic acids, silic acids and tetrafluoroboric acids. Among these, preferred are tertiary amines such as triethylamine, tributylamine, N,N-dimethylcyclohexylamine and N,N-dicyclohexylmethylamine; tertiary phosphines such as trimethylphosphine, triethylphosphine, tributylphosphine, tricyclohexylphosphine and triphenylphosphine; quaternary ammonium salts such as tetramethylammonium chloride, tetramethylammonium bromide, tetra-n-butylammonium chloride and tetra-n-butylammonium bromide; and quaternary phosphonium salts such as tetramethylphosphonium chloride, tetramethylphosphonium bromide, tetra-n-butylphosphonium chloride and tetra-n-butylammonium bromide in the light of controllability of the polymerization reaction.

The polythiocarbonate polythioether obtained after the curing reaction exhibits excellent mechanical properties (a high bending distortion and a high glass transition temperature) as described below in Examples, as a result of introduction of an intramolecular polythiocarbonate structure, and furthermore has excellent optical properties (a high refractive index and a high Abbe's number), so that it is significantly useful as an optical material.

EXAMPLES

There will be specifically described the present invention with reference to Examples and Comparative Examples. The physical properties of polythiocarbonate polythiols and polythiocarbonate polythioethers were determined by the following methods, respectively.

Physical Properties of a polythiocarbonate polythiol

1. Mercapto value (SH value; mg KOH/g):
In a 100 mL (milliliter) sample bottle was weighed out a sample (the weight was precisely read to four places of decimals in gram), to which were precisely added 5 mL of an acetic anhydride-tetrahydrofuran solution (containing 4 g of acetic anhydride in 100 mL of the solution) and 10 mL of a 4-dimethylaminopyridine-tetrahydrofuran solution (containing 1 g of 4-dimethylaminopyridine in 100 mL of the solution), and after completely dissolving the sample, the mixture was left at room temperature for one hour, 1 mL of ultrapure water was precisely added, the mixture was left at room temperature for 30 min while being sometimes stirred, and the mixture was titrated with a 0.25M solution of potassium hydroxide-ethanol (indicator: phenolphthalein). An SH value was calculated using the following equation.

$$\text{SH value(mg KOH/g)} = 14.025 \times (B-A) \times f/S$$

wherein S represents a sample weight (g); A represents the amount (mL) of the 0.25M solution of potassium hydroxide-ethanol required for titrating the sample; B represents the amount (mL) of the 0.25M solution of potassium hydroxide-ethanol required for a blank test; and f represents a factor of the 0.25M solution of potassium hydroxide-ethanol.

2. Number average molecular weight (Mn): calculated by the following equation.

$$Mn = 112200/\text{SH value}$$

3. Acid value (mg KOH/g): a sample was dissolved in 200 mL of a toluene-ethanol solution (equivolume mixture solution) and the mixture was titrated with a 0.1M potassium hydroxide-ethanol solution (indicator:phenolphthalein). An acid value was calculated using the following equation:

$$\text{Acid value(mg KOH/g)} = 5.61(C-D)f'/S'$$

wherein S' represents a sample weight (g); C represents the amount (mL) of the 0.1M potassium hydroxide-ethanol solution required for titrating the sample; D represents the amount (mL) of the 0.1M potassium hydroxide-ethanol solution required for a blank test; and f' represents a factor of the 0.1M potassium hydroxide-ethanol solution.

4. Melting point (° C.) and crystallization temperature (° C.): Determined using a differential scanning calorimeter (Shimadzu Corporation; DSC-50) under a nitrogen gas atmosphere over the temperature range of −100 to 100° C. with a temperature-increase rate of 10° C./min and a temperature-decrease rate of 10° C./min.

5. Viscosity (mPa·sec): Determined using a type E rotational viscometer (Brookfield Inc.; programmable digital viscometer DV-II+) at 100° C.

6. Hue (APHA): Determined in accordance with JIS-K1557.

7. Proportion of aryloxy groups in terminal groups (%): A proportion (molar proportion) of phenoxy groups to the total terminal groups was determined from an integration value of $^1$H-NMR.

8. Proportion of a thioether structure (formed by a de-COS reaction) (%): The total amount (molar amount) of a residual thiocarbonate structure and a thioether structure formed after the de-COS reaction was determined from an integration value of $^1$H-NMR, and then a proportion (molar proportion) of the thioether structure to the total amount was determined.

9. Remaining catalyst amount (ppm; by weight): 30% by weight solution of a polythiocarbonate polythiol in chloroform was prepared, and tetrabutylammonium hydroxide in the solution was extracted with water in the same volume and measured by high performance liquid chromatography.

Physical properties of a polythiocarbonate polythioether

1. Refractive index ($n_e$): Using a refractometer (ATAGO Co., Ltd., Abbe refractometer; MR-04), a refractive index was measured under e-beam ($\lambda$=546 nm) radiation.

2. Abbe's number ($v_e$): Using the above refractometer, refractive indices (ne, nF', nC') were measured under e-beam (λ=546 nm), F'-beam (λ=480 nm) and C'-beam (λ=644 nm), respectively and then an Abbe's number was calculated using the following equation.

$$ve=(ne-1)/(nF'-nC')$$

3. Bending properties: A flexural modulus, a flexural strength and a distortion to bending failure were determined from the measurements at 23° C. and 50% RH using a testing machine for three point bending (Orientec Co., Ltd.; Tensiron UCT-5T) in accordance with JIS-K7171. A test piece had a size of 25 mm (width)×40 mm (length)×1 mm (thickness); a distance between supporting tables was 32 mm, and radii of an indenter and a supporting table were 5.0 mm and 2.0 mm, respectively.

4. Glass transition temperature (Tg; ° C.): Determined under a nitrogen gas atmosphere over a temperature range of −100° C. to 250° C. with a temperature-increase rate of 10° C./min and a temperature-decrease rate of 10° C./min using a differential scanning calorimeter (Perkin Elmer; PYRIS Diamond DSC).

Example 1

Preparation of bis(β-epithiopropyl)ether

Bis(β-epoxypropyl)ether was prepared using 3-epoxypropyloxypropene as a starting material as described in European Journal of Organic Chemistry, 2001, 875, and bis(β-epithiopropyl)ether was prepared using bis(β-epoxypropyl)ether as a starting material as described in Japanese Laid-open Patent Publication No. 2000-336087.

Preparation of a polythiocarbonate polythiol

In 500 mL (milliliter) glass reactor equipped with a stirrer, a thermometer and a distillation column (having a fractionating column, a reflux head and a condenser in the column head), were fed 90.1 g (0.599 mol) of 1,6-hexanedithiol, 77.2 g (0.500 mol) of bis(2-mercaptoethyl)sulfide, 155 g (0.725 mol) of diphenyl carbonate and 0.861 g (0.332 mmol) of a 10% by weight tetrabutylammonium hydroxide-methanol solution (catalyst), and the mixture was maintained under reflux at 200 mmHg (27 kPa) and 160° C. for one hour. Then, the system was gradually vacuumed to 50 mmHg over 6 hours while evaporating phenol, and when phenol was no longer distilled, a pressure was gradually reduced from 30 mmHg (4.0 kPa) to 15 mmHg (2.0 kPa) over 3 hours to react the mixture, while distilling a mixture of phenol, 1,6-hexanedithiol and bis(2-mercaptoethyl)sulfide. Thus, a desired polythiocarbonate polythiol was obtained.

To the polythiocarbonate polythiol was added p-toluenesulfonic acid monohydrate in an equimolar to the above catalyst, and the mixture was stirred at 130° C. for 2 hours to inactivate the catalyst. Then, to the mixture was added 430 g of methylene chloride to dissolve the polythiocarbonate polythiol, and the resulting solution was washed with water in the same volume three times and dried over anhydrous magnesium sulfate, and the solid was removed by filtration and methylene chloride was evaporated. Physical properties of the end-product polythiocarbonate polythiol (A) are shown in Table 1.

Preparation of a polythiocarbonate polythioether

In a 30 mL (internal volume) glass reactor equipped with a stirring bar, 0.914 g (1.72 mmol) of polythiocarbonate polythiol (A) was completely dissolved in 8.47 g (52.2 mmol) of bis(β-epithiopropyl)ether at room temperature (25° C.), and after adding 0.017 g of N,N-dimethylcyclohexylamine at this temperature, the mixture was reacted for 2 hours. The reaction solution was poured into a mold in which a silicon rubber spacer with a thickness of 1 mm was sandwiched by two glass plates, and was left at room temperature (25° C.) for 12 hours. It was warmed from 30° C. to 100° C. over 27 hours, and the resulting cured polymer was removed from the mold. Table 2 shows the composition of the polythiocarbonate polythioether (I) thus obtained.

The polythiocarbonate polythioether (I) was cut into a piece with a predetermined size, which was measured for optical and mechanical properties. The results are shown in Table 3.

Example 2

Preparation of a polythiocarbonate polythioether

In a reactor as described in Example 1, 0.680 g (1.28 mmol) of polythiocarbonate polythiol (A) and 0.0847 g (0.549 mmol) of bis(2-mercaptoethyl sulfide) were completely dissolved in 8.24 g (50.8 mmol) of bis(β-epithiopropyl)ether at room temperature (25° C.), and after adding 0.031 g of N,N-dimethylcyclohexylamine at this temperature, the mixture was reacted for 2 hours. Then, the procedure as described in Example 1 was conducted to provide the target polythiocarbonate polythioether (II). Table 2 shows the composition of polythiocarbonate polythioether (II), and Table 3 shows its optical and mechanical properties.

Example 3

Preparation of a polythiocarbonate polythiol

In a reactor as described in Example 1 were placed 105 g (0.700 mol) of 1,6-hexanedithiol, 61.7 g (0.400 mol) of bis (2-mercaptoethyl sulfide), 155 g (0.725 mol) of diphenyl carbonate and 0.861 g (0.332 mmol) of a 10% by weight tetrabutylammonium hydroxide-methanol solution (catalyst), and the resulting mixture was treated as described in Example 1 to distill a mixture of phenol, 1,6-hexanedithiol and bis(2-mercaptoethyl)sulfide. Subsequently, while distilling a mixture of 1,6-hexanedithiol and bis(2-mercaptoethyl) sulfide at 7 to 5 mmHg (0.93 to 0.67 kPa) over 3 hours, the reaction was carried out to provide the target polythiocarbonate polythiol.

Then, inactivation of the catalyst, addition of methylene chloride, washing with water, drying, filtration and evaporation of methylene chloride were conducted as described in Example 1. Table 1 shows the physical properties of the end-product polythiocarbonate polythiol (B).

Preparation of a polythiocarbonate polythioether

In a reactor as described in Example 1, 0.990 g (0.523 mmol) of polythiocarbonate polythiol (B) was completely dissolved in 8.24 g (50.8 mmol) of bis(β-epithiopropyl)ether at room temperature (25° C.), and after adding 0.031 g of N,N-dimethylcyclohexylamine at this temperature, the mixture was reacted for 2 hours. Then, the procedure as described in Example 1 was repeated to provide the target polythiocarbonate polythioether (III). Table 2 shows the composition of polythiocarbonate polythioether (III) and Table 3 shows its optical and mechanical properties.

Example 4

Preparation of a polythiocarbonate polythioether

In a reactor as described in Example 1, 2.61 g (1.38 mmol) of polythiocarbonate polythiol (B) was completely dissolved in 6.45 g (39.7 mmol) of bis(β-epithiopropyl)ether at room temperature (25° C.), and after adding 0.034 g of N,N-dimethylcyclohexylamine at this temperature, the mixture was reacted for 2 hours. Then, the procedure as described in Example 1 was repeated to provide the target polythiocarbonate polythioether (IV). Table 2 shows the composition of polythiocarbonate polythioether (IV) and Table 3 shows its optical and mechanical properties.

Example 5

Preparation of a polythiocarbonate polythiol

In a reactor as described in Example 1, were fed 93.4 g (0.622 mol) of 1,6-hexanedithiol, 93.4 g (0.622 mol) of 3-methyl-1,5-pentanedithiol, 182 g (0.850 mol) of diphenyl carbonate and 3.07 g (1.18 mmol) of a 10% by weight tetrabutylammonium hydroxide-methanol solution (catalyst), and the resulting mixture solution was treated as described in Example 1 to carry out the reaction, while distilling a mixture of phenol, 1,6-hexanedithiol and 3-methyl-1,5-pentanedithiol. Thus, the target polythiocarbonate polythiol was obtained.

Then, inactivation of the catalyst, addition of methylene chloride, washing with water, drying, filtration and evaporation of methylene chloride were conducted as described in Example 1. Table 1 shows the physical properties of the end-product polythiocarbonate polythiol (C).

Preparation of a polythiocarbonate polythioether

In a reactor as described in Example 1, 0.926 g (1.43 mmol) of polythiocarbonate polythiol (C) was completely dissolved in 8.24 g (50.8 mmol) of bis(β-epithiopropyl)ether at room temperature (25° C.), and after adding 0.031 g of N,N-dimethylcyclohexylamine at this temperature, the mixture was reacted for 2 hours. Then, the procedure as described in Example 1 was repeated to provide the target polythiocarbonate polythioether (V). Table 2 shows the composition of polythiocarbonate polythioether (V) and Table 3 shows its optical and mechanical properties.

Example 6

Preparation of a polythiocarbonate polythiol

In a reactor as described in Example 1, were fed 114 g (0.761 mol) of 1,6-hexanedithiol, 76.7 g (0.435 mol) of 1,4-bis(mercaptomethyl)cyclohexane, 160 g (0.747 mol) of diphenyl carbonate and 0.908 g (0-350 mmol) of a 10% by weight tetrabutylammonium hydroxide-methanol solution (catalyst), and the resulting mixture solution was treated as described in Example 1 to carry out the reaction, while distilling a mixture of phenol, 1,6-hexanedithiol and 1,4-bis(mercaptomethyl)cyclohexane. Thus, the target polythiocarbonate polythiol was obtained.

Then, inactivation of the catalyst, addition of methylene chloride, washing with water, drying, filtration and evaporation of methylene chloride were conducted as described in Example 1. Table 1 shows the physical properties of the end-product polythiocarbonate polythiol (D).

Preparation of a polythiocarbonate polythioether

In a reactor as described in Example 1, 0.919 g (1.71 mmol) of polythiocarbonate polythiol (D) was completely dissolved in 8.23 g (50.7 mmol) of bis(β-epithiopropyl)ether at room temperature (25° C.), and after adding 0.033 g of N,N-dimethylcyclohexylamine at this temperature, the mixture was reacted for 2 hours. Then, the procedure as described in Example 1 was repeated to provide the target polythiocarbonate polythioether (VI). Table 2 shows the composition of polythiocarbonate polythioether (VI) and Table 3 shows its optical and mechanical properties.

Example 7

Preparation of a polythiocarbonate polythiol

In a reactor as described in Example 1, 49.8 g (0.331 mol) of 1,6-hexanedithiol, 40.2 g (0.189 mol) of 2,5-bis(mercaptomethyl)-1,4-dithiane, 67.5 g (0.315 mol) of diphenyl carbonate and 0.423 g (0.163 mmol) of a 10% by weight tetrabutylammonium hydroxide-methanol solution (catalyst), and then the resulting mixture solution was treated as described in Example 1 to carry out the reaction, while distilling a mixture of phenol, 1,6-hexanedithiol and 2,5-bis(mercaptomethyl)-1,4-dithiane. Thus, the target polythiocarbonate polythiol was obtained.

Then, inactivation of the catalyst, addition of methylene chloride, washing with water, drying, filtration and evaporation of methylene chloride were conducted as described in Example 1. Table 1 shows the physical properties of the end-product polythiocarbonate polythiol (E).

Preparation of a polythiocarbonate polythioether

In a reactor as described in Example 1, 0.901 g (1.57 mmol) of polythiocarbonate polythiol (E) was completely dissolved in 8.24 g (50.8 mmol) of bis(β-epithiopropyl)ether at room temperature (25° C.), and after adding 0.031 g of N,N-dimethylcyclohexylamine at this temperature, the mixture was reacted for 2 hours. Then, the procedure as described in Example 1 was repeated to provide the target polythiocarbonate polythioether (VII). Table 2 shows the composition of polythiocarbonate polythioether (VII) and Table 3 shows its optical and mechanical properties.

Comparative Example 1

Preparation of a polythioether

In a 30 mL (internal volume) glass reactor equipped with a stirring bar, 0.286 g (1.85 mmol) of bis(2-mercaptoethyl)sulfide was completely dissolved in 8.77 g (54.1 mmol) of bis(β-epithiopropyl)ether at room temperature (25° C.), and after adding 0.0087 g of N,N-dimethylcyclohexylamine at this temperature, the mixture was reacted for 2 hours. The reaction solution was poured into a mold in which a silicon rubber spacer with a thickness of 1 mm was sandwiched by two glass plates, and was left at room temperature (25° C.) for 12 hours. It was warmed from 30° C. to 100° C. over 27 hours, and the resulting cured polymer was removed from the mold. Table 2 shows the composition of the polythioether (VIII) thus obtained and Table 3 shows its optical and mechanical properties.

Comparative Example 2

Preparation of a polythioether

In a reactor as described in Comparative Example 1, 0.934 g (6.05 mmol) of bis(2-mercaptoethyl)sulfide was completely dissolved in 8.30 g (51.2 mmol) of bis(β-epithiopropyl)ether at room temperature (25° C.), and after adding 0.0346 g of N,N-dimethylcyclohexylamine at this temperature, the mixture was reacted for 2 hours. Then, the procedure as described in Comparative Example 1 was repeated to provide polythioether (IX). Table 2 shows the composition of polythioether (IX) and Table 3 shows its optical and mechanical properties.

Example 8

Preparation of 2,5-bis(β-epithiopropylthiomethyl)-1,4-dithiane 2,5-Bis(β-epithiopropylthiomethyl)-1,4-dithiane was prepared as described in Japanese Laid-open Patent Publication No. 1997-255781.

Preparation of a polythiocarbonate polythioether

In a reactor as described in Example 1, 0.930 g (1.75 mmol) of polythiocarbonate polythiol (A) and 3.30 g (9.27 mmol) of 2,5-bis(β-epithiopropylthiomethyl)-1,4-dithiane were completely dissolved in 5.07 g (31.2 mmol) of bis(β-epithiopropyl)ether at room temperature (25° C.), and after adding 0.017 g of N,N-dimethylcyclohexylamine at this temperature, the mixture was reacted for 2 hours. Then, the procedure as described in Example 1 was repeated to provide the target polythiocarbonate polythioether (X). Table 2 shows the composition of polythiocarbonate polythioether (X) and Table 3 shows its optical and mechanical properties.

Example 9

Preparation of 1,2-bis(β-epithiopropyloxy)ethane 1,2-Bis(β-epithiopropyloxy)ethane was prepared from 1,2-bis(β-epoxypropyloxy)ethane by a known method.

Preparation of a polythiocarbonate polythioether

In a reactor as described in Example 1, 1.80 g (3.39 mmol) of polythiocarbonate polythiol (A) was completely dissolved in 16.4 g (79.3 mmol) of 1,2-bis(β-epithiopropyloxy)ethane at room temperature (25° C.), and after adding 0.033 g of N,N-dimethylcyclohexylamine at this temperature, the mixture was reacted for 2 hours. Then, the procedure as described in Example 1 was repeated to provide the target polythiocarbonate polythioether (XI). Table 2 shows the composition of polythiocarbonate polythioether (XI) and Table 3 shows its optical and mechanical properties.

Comparative Example 3

Preparation of a polythioether

In a reactor as described in Comparative Example 1, 0.266 g (1.73 mmol) of bis(2-mercaptoethyl)sulfide was completely dissolved in 8.75 g (42.4 mmol) of 1,2-bis(β-epithiopropyloxy)ethane at room temperature (25° C.), and after adding 0.033 g of N,N-dimethylcyclohexylamine at this temperature, the mixture was reacted for 2 hours. Then, the procedure as described in Comparative Example 1 was repeated to provide the target polythioether (XII). Table 2 shows the composition of polythioether (XII) and Table 3 shows its optical and mechanical properties.

Example 10

Preparation of bis(β-epithiopropyl)sulfide

By a known process, β-epoxypropylchloride was converted using sodium hydrosulfide into bis(β-epoxypropyl)sulfide, which was reacted with thiourea to give bis(β-epithiopropyl)sulfide.

Preparation of a polythiocarbonate polythioether

In a reactor as described in Example 1, 1.01 g (1.91 mmol) of polythiocarbonate polythiol (A) was completely dissolved in 8.03 g (45.0 mmol) of bis(β-epithiopropyl)sulfide at room temperature (25° C.), and after adding 0.016 g of N,N-dimethylcyclohexylamine at this temperature, the mixture was reacted for 1 hour. Then, the procedure as described in Example 1 was repeated to provide the target polythiocarbonate polythioether (XIII). Table 2 shows the composition of polythiocarbonate polythioether (XIII) and Table 3 shows its optical and mechanical properties.

Comparative Example 4

Preparation of a polythioether

In a reactor as described in Example 1, 0.287 g (1.86 mmol) of bis(2-mercaptoethyl)sulfide was completely dissolved in 8.72 g (48.9 mmol) of bis(β-epithiopropyl)sulfide at room temperature (25° C.), and after adding 0.016 g of N,N-dimethylcyclohexylamine at this temperature, the mixture was reacted for 1 hour. Then, the procedure as described in Comparative Example 1 was repeated to provide the target polythioether (XIV). Table 2 shows the composition of polythioether (XI and Table 3 shows its optical and mechanical properties.

Example 11

Preparation of bis(β-epithiopropyl)disulfide

Bis(β-epithiopropyl)disulfide was prepared as described in Japanese Laid-open Patent Publication No. 2000-281787.

Preparation of a polythiocarbonate polythioether

In a reactor as described in Example 1, 1.00 g (1.88 mmol) of polythiocarbonate polythiol (A) was completely dissolved in 8.23 g (39.1 mmol) of bis(β-epithiopropyl)disulfide at room temperature (25° C.), and after adding 0.016 g of N,N-dimethylcyclohexylamine at this temperature, the mixture was reacted for 1 hour. Then, the procedure as described in Example 1 was repeated to provide the target polythiocarbonate polythioether (XV). Table 2 shows the composition of polythiocarbonate polythioether (XV) and Table 3 shows its optical and mechanical properties.

Comparative Example 5

Preparation of a polythioether

In a reactor as described in Comparative Example 1, 0.297 g (1.92 mmol) of bis(2-mercaptoethyl)sulfide was completely dissolved in 8.77 g (41.7 mmol) of bis(β-epithiopropyl)disulfide at room temperature (25° C.), and after adding 0.016 g of N,N-dimethylcyclohexylamine at this temperature, the mixture was reacted for 1 hour. Then, the procedure as described in Comparative Example 1 was repeated to provide polythioether (XVI). Table 2 shows the composition of polythioether (XVI) and Table 3 shows its optical and mechanical properties.

Example 12

Preparation of a polythiocarbonate polythiol

In a reactor as described in Example 1, were placed 15.0 g (0.0995 mol) of 1,6-hexanedithiol, 76.6 g (0.496 mol) of bis(2-mercaptoethyl)sulfide, 87.6 g (0.497 mol) of 1,4-bis(mercaptomethyl)cyclohexane, 142 g (0.662 mol) of diphenyl carbonate and 0.880 g (0.339 mmol) of a 10% by weight tetrabutylammonium hydroxide-methanol solution (catalyst), and then the resulting mixture solution was treated as described in Example 1 to carry out the reaction, while distilling a mixture of phenol, 1,6-hexanedithiol, bis(2-mercaptoethyl)sulfide and 1,4-bis(mercaptomethyl)cyclohexane. Thus, the target polythiocarbonate polythiol was obtained.

Then, inactivation of the catalyst, addition of methylene chloride, washing with water, drying, filtration and evaporation of methylene chloride were conducted as described in Example 1. Table 1 shows the physical properties of the end-product polythiocarbonate polythiol (F).

Preparation of a polythiocarbonate polythioether

In a reactor as described in Example 1, 1.72 g (3.54 mmol) of polythiocarbonate polythiol (F) was completely dissolved in 15.5 g (95.6 mmol) of bis(β-epithiopropyl)ether at room temperature (25° C.), and after adding 0.034 g of N,N-dimethylcyclohexylamine at this temperature, the mixture was reacted for 2 hours. Then, the procedure as described in Example 1 was repeated to provide the target polythiocarbonate polythioether (XVII). Table 2 shows the composition of polythiocarbonate polythioether (XVII) and Table 3 shows its optical and mechanical properties.

Example 13

Preparation of α-polythiocarbonate polythiol

In a reactor as described in Example 1, were fed 33.3 g (0.222 mol) of 1,6-hexanedithiol, 29.2 g (0.189 mol) of bis(2-mercaptoethyl)sulfide, 24.6 g (0.0943 mol) of 1,8-mercapto-4-mercaptomethyl-3,6-thiaoctane, 68.0 g (0.321 mol) of diphenyl carbonate and 0.438 g (0.169 mmol) of a 10% by weight tetrabutylammonium hydroxide-methanol solution (catalyst), and then the resulting mixture solution was treated as described in Example 1 to carry out the reaction, while distilling a mixture of phenol, 1,6-hexanedithiol, bis(2-mercaptoethyl)sulfide and 1,8-mercapto-4-mercaptomethyl-3,6-thiaoctane. This, the target polythiocarbonate polythiol was obtained.

Then, inactivation of the catalyst, addition of methylene chloride, washing with water, drying, filtration and evaporation of methylene chloride were conducted as described in Example 1. Table 1 shows the physical properties of the end-product polythiocarbonate polythiol (G).

Preparation of a polythiocarbonate polythioether

In a reactor as described in Example 1, 0.921 g (1.75 mmol) of polythiocarbonate polythiol (G) was completely dissolved in 8.20 g (50.6 mmol) of bis(β-epithiopropyl)ether at room temperature (25° C.), and after adding 0.033 g of N,N-dimethylcyclohexylamine at this temperature, the mixture was reacted for 2 hours. Then, the procedure as described in Example 1 was repeated to provide the target polythiocarbonate polythioether (XVIII). Table 2 shows the composition of polythiocarbonate polythioether (XVIII) and Table 3 shows its optical and mechanical properties.

TABLE 1

| Polythiocarbonate polythiol | | | SH value (mgKOH/g) | Average molecular weight Mn | Acid value (mgKOH/g) | Viscosity (mPa·sec) | Melting point (° C.) | Crystallization temperature (° C.) | Hue (APHA) | Terminal aryloxy (%) | (Thio)ether structure (%) | Remaining catalyst amount (ppm) |
|---|---|---|---|---|---|---|---|---|---|---|---|---|
| Ex. 1 | (a) + (b) | A | 214.1 | 524 | 0.09 | 111 | 13.2 | −9.0 | 10 | <1 | <1 | <2 |
| Ex. 3 | (a) + (b) | B | 59.29 | 1892 | 0.04 | 2943 | 37.4 | 5.1 | 10 | <1 | <1 | <2 |
| Ex. 5 | (a) + (c) | C | 173.4 | 647 | 0.07 | 137 | — | — | 10 | <1 | <1 | <2 |
| Ex. 6 | (a) + (d) | D | 208.4 | 538 | 0.06 | 124 | 24.0 | 0.6 | 10 | <1 | <1 | <2 |
| Ex. 7 | (a) + (e) | E | 194.9 | 576 | 0.06 | 423 | 15.5 | — | 10 | <1 | <1 | <2 |
| Ex. 12 | (a) + (b) + (d) | F | 231.3 | 485 | 0.03 | 118 | — | — | 10 | <1 | <1 | <2 |
| Ex. 13 | (a) + (b) + (f) | G | 237.5 | (527) | 0.07 | 132 | — | — | 10 | <1 | <1 | <2 |

(a): 1,6-Hexanedithiol, (b): Bis(2-mercaptoethyl) sulfide, (c): 3-Methyl-1,5-pentanedithiol, (d): 1,4-Bis(mercaptomethyl)cyclohexane, (e): 2,5-Bis(mercaptomethyl)-1,4-dithiane, (f): 1,8-Mercapto-4-mercaptomethyl-3,6-thiaoctane
* The symbol "—" means that melting or crystallization does not occur at a temperature-increase or temperature-decrease rate of 10° C./min in the range of −100° C. to 100° C.
** The thioether structure is formed by a de-COS reaction.
*** An average molecular weight Mn of polythiocarbonate polythiol (G) cannot be calculated from an SH value because the compound has a crosslinked structure. It is, therefore calculated from material balance and given in parentheses.

TABLE 2

| | Component (a) | | Component (b) | | Component (c) | |
|---|---|---|---|---|---|---|
| | Polythio-carbonate polythiol | Content (wt %) | Episulfide compound | Content (wt) | Optional organic compound | Content (wt) |
| Example 1 | A | 9.7 | Bis(β-epithiopropyl) ether | 90 | — | — |
| Example 2 | A | 7.5 | Bis(β-epithiopropyl) ether | 92 | Bis(2-mercaptoethyl) sulfide | 1.0 |
| Example 3 | B | 11 | Bis(β-epithiopropyl) ether | 89 | — | — |

TABLE 2-continued

| | Component (a) | | Component (b) | | Component (c) | |
|---|---|---|---|---|---|---|
| | Polythio-carbonate polythiol | Content (wt %) | Episulfide compound | Content (wt) | Optional organic compound | Content (wt) |
| Example 4 | B | 29 | Bis(β-epithiopropyl) ether | 71 | — | — |
| Example 5 | C | 10 | Bis(β-epithiopropyl) ether | 90 | — | — |
| Example 6 | D | 10 | Bis(β-epithiopropyl) ether | 90 | — | — |
| Example 7 | E | 9.9 | Bis(β-epithiopropyl) ether | 90 | — | — |
| Comparative Example 1 | — | — | Bis(β-epithiopropyl) ether | 97 | Bis(2-mercaptoethyl) sulfide | 3.2 |
| Comparative Example 2 | — | — | Bis(β-epithiopropyl) ether | 90 | Bis(2-mercaptoethyl) sulfide | 10 |
| Example 8 | A | 10 | Bis(β-epithiopropyl) ether/ 2,5-Bis(β-epithiopropylthiomethyl)-1,4-dithiane | 90 | — | — |
| Example 9 | A | 9.9 | 1,2-Bis(β-epithiopropyloxy)ethane | 90 | — | — |
| Comparative Example 3 | — | — | 1,2-Bis(β-epithiopropyloxy)ethane | 97 | Bis(2-mercaptoethyl) sulfide | 3.0 |
| Example 10 | A | 11 | Bis(β-epithiopropyl) sulfide | 89 | — | — |
| Comparative Example 4 | — | — | Bis(β-epithiopropyl) sulfide | 97 | Bis(2-mercaptoethyl) sulfide | 3.2 |
| Example 11 | A | 11 | Bis(β-epithiopropyl) disulfide | 89 | — | — |
| Comparative Example 5 | — | — | Bis(β-epithiopropyl) disulfide | 97 | Bis(2-mercaptoethyl) sulfide | 3.3 |
| Example 12 | F | 10 | Bis(β-epithiopropyl) ether | 90 | — | — |
| Example 13 | G | 10 | Bis(β-epithiopropyl) ether | 90 | — | — |

TABLE 3

| | Polythio ether | Refractive index $n_e$ | Abbe's number $v_e$ | Flexural modulus (MPa) | Flexural strength (MPa) | Distortion to bending failure (%) | Tg (°C.) |
|---|---|---|---|---|---|---|---|
| Example 1 | I | 1.658 | 42.7 | 2833 | 67.62 | 3.83 | 83.0 |
| Example 2 | II | 1.658 | 40.9 | 3036 | 72.08 | 3.52 | 86.7 |
| Example 3 | III | 1.661 | 38.9 | 2637 | 72.32 | 3.94 | 92.1 |
| Example 4 | IV | 1.650 | 39.2 | 1281 | 37.32 | 4.57 | 83.2 |
| Example 5 | V | 1.650 | 38.0 | 2495 | 69.29 | 3.61 | 89.1 |
| Example 6 | VI | 1.651 | 42.8 | 2643 | 67.32 | 4.00 | 115.4 |
| Example 7 | VII | 1.653 | 38.0 | 3150 | 80.56 | 3.28 | 123.9 |
| Comparative Example 1 | VIII | 1.657 | 37.1 | 3399 | 73.73 | 2.75 | 90.5 |
| Comparative Example 2 | IX | 1.657 | 38.0 | 2870 | 72.62 | 3.86 | 66.7 |
| Example 8 | X | 1.672 | 38.9 | 2869 | 77.67 | 4.12 | 99.6 |
| Example 9 | XI | 1.625 | 39.1 | 2200 | 63.06 | 5.92 | 60.9 |
| Comparative Example 3 | XII | 1.625 | 43.7 | 2513 | 65.10 | 4.46 | 67.5 |
| Example 10 | XIII | 1.706 | 38.4 | 3060 | 77.13 | 3.77 | 80.5 |
| Comparative Example 4 | XIV | 1.710 | 34.2 | 3490 | 85.27 | 3.10 | 84.4 |
| Example 11 | XV | 1.727 | 35.2 | 2624 | 73.16 | 3.89 | 79.7 |
| Comparative Example 5 | XVI | 1.735 | 34.8 | 3216 | 79.92 | 3.14 | 83.9 |
| Example 12 | XVII | 1.659 | 42.5 | 2944 | 78.92 | 3.20 | 107.7 |
| Example 13 | XVIII | 1.662 | 41.6 | 3078 | 83.94 | 3.90 | 89.9 |

Industrial Applicability

A polythiocarbonate polythioether obtained by curing a polymerizable composition of the present invention has excellent optical properties, that is, a high refractive index and a low dispersion and excellent mechanical properties, that is, a high bending distortion and a high glass transition temperature, and thus will be applicable to optical materials such as a plastic lens, a prism, an optical fiber, an information storage board, a color filter, an infrared absorbing filter, an optical film and an adhesive.

The invention claimed is:

1. A polymerizable composition comprising:
   Component (a): a polythiocarbonate polythiol,
   Component (b): an episulfide compound, and
   optionally, Component (c): an organic compound having a functional group reactive to said episulfide compound.

2. The polymerizable composition as claimed in claim 1, comprising Component (a) in amount of 1 to 40% by weight, Component (b) in amount of 50 to 99% by weight and Component (c) in amount of 0 to 20% by weight.

3. The polymerizable composition as claimed in claim 1, wherein said polythiocarbonate polythiol comprises:
   a thiocarbonate moiety represented by formula (1):

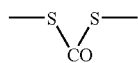

(1)

one or two or more polyvalent hydrocarbon groups to which the thiocarbonate moiety is bound, wherein these polyvalent hydrocarbon groups may optionally have a substituent uninvolved in a ring-opening reaction of said episulfide compound and may optionally contain a heteroatom or a ring structure in their carbon chain, and a terminal SH group, and wherein said polythiocarbonate polythiol has a number average molecular weight of 200 to 2500.

4. The polymerizable composition as claimed in claim 3, wherein said polythiocarbonate polythiol has a repeating unit represented by formula (2):

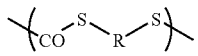 (2)

wherein R represents a divalent hydrocarbon group, which optionally may have a substituent uninvolved in a ring-opening reaction of the episulfide compound and may contain a heteroatom or a ring structure in its carbon chain, and, in addition, Rs in one molecular chain may be the same or different; and wherein said polythiocarbonate polythiol has a number average molecular weight of 200 to 2500.

5. The polymerizable composition as claimed in claim 1, wherein said polythiocarbonate polythiol is a liquid at 40° C.

6. The polymerizable composition as claimed in claim 1, wherein said polythiocarbonate polythiol has an American Public Health Association (APHA) color index of 60 or less.

7. The polymerizable composition as claimed in claim 1, wherein 5 mol % or less of the terminal groups in said polythiocarbonate polythiol are terminal groups other than SH.

8. The polymerizable composition as claimed in claim 1, wherein said polythiocarbonate polythiol is synthesized by a transesterification reaction, and the amount of a remaining transesterification catalyst is 40 ppm or less based on the weight of the polythiocarbonate polythiol.

9. The polymerizable composition as claimed in claim 1, wherein said episulfide compound has at least two episulfide groups in one molecule.

10. The polymerizable composition as claimed in claim 1, wherein the organic compound as Component (c) is at least one selected from the group consisting of thiol compounds, amine compounds, allyl compounds, (meth)acrylate compounds, organic acids and their anhydrides, mercaptoorganic acids, mercaptoamines and phenol compounds.

11. The polymerizable composition as claimed in claim 1, further comprising a basic catalyst as a curing catalyst.

12. The polymerizable composition as claimed in claim 11, wherein said basic catalyst is at least one selected from the group consisting of tertiary amines, tertiary phosphines, quaternary ammonium salts and quaternary phosphonium salts.

13. A polythiocarbonate polythioether prepared by curing the polymerizable composition as claimed in claim 1.

* * * * *